THERMAL SWITCH HEATED BY A LIGHT SENSITIVE GAS TUBE

Original Filed April 26, 1967

Inventor:
John M. Anderson,
by John F. Ahern
His Attorney.

United States Patent Office 3,483,394

Patented Dec. 9, 1969

3,483,394

THERMAL SWITCH HEATED BY A LIGHT SENSITIVE GAS TUBE

John M. Anderson, Scotia, N.Y., assignor to General Electric Company, a corporation of New York Continuation of application Ser. No. 633,958, Apr. 26, 1967. This application Jan. 24, 1969, Ser. No. 800,331
Int. Cl. H01h 37/00
U.S. Cl. 307—117 11 Claims

ABSTRACT OF THE DISCLOSURE

Photoelectric control apparatus for switching electric loads includes photoelectric means such as one or more high current capacity glow discharge devices having large cathode areas adapted to couple with an external switch in circuit with a source of supply voltage. A thermal switch, in circuit with the electric load, is responsive to current conduction or the prolonged interruption thereof to switch the load. Current is conducted by the discharge device when the applied voltage and incident radiant energy are of sufficient magnitude. Parallel connected glow discharge devices, one continuously operating may be used to expand the range of operating voltages.

Figure 1:
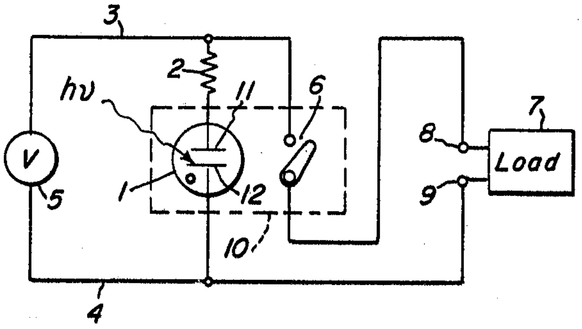

Especially adapted glow discharge devices containing large cathode areas as compared with the anode thereof which cathodes may be thermally coupled with exterior members thereto are also disclosed.

This application is a continuation of application Ser. No. 633,958 filed Apr. 26, 1967, now abandoned.

The present invention relates to apparatus and devices useful in the actuation and switching of electric loads in response to concurrent excitation with a voltage and with impinging radiant energy. More particularly the present invention relates to photoelectric light sensitive switching apparatus for actuating and de-actuating electric loads as for example street lights, by the direct action of the heating effect of a gaseous discharge device.

This application is related to the copending, concurrently filed application of Joe A. Nuckolls and Mitchell M. Osteen, Ser. No. 633,981 filed Apr. 26, 1967 and assigned to the assignee of the present invention.

Many types of electric loads are actuated in such a manner as to be responsive to ambient radiation so that the device may be operative during the daylight hours or during the night time hours as desired. Thus, for example, it is desirable to automatically control street light facilities so that individual street lights are rendered operating when the ambient light incident thereupon falls below a predetermined level and to continue them in operation until the ambient light incident thereupon again rises to a predetermined level. Prior art devices for the accomplishment of this have often utilized cadmium sulphide photocells which conduct current when electrically actuated and irradiated with a sufficient value of ambient light. While such devices are useful in many applications, the components thereof are relatively expensive and the reliability of the devices is not sufficiently high as is desired.

Accordingly, it is an object of the present invention to provide photoelectric control apparatus and devices suitable for actuating electric loads in response to concurrent excitation by a predetermined voltage and predetermined level of light intensity which are simple, economical of construction and highly reliable.

A further object of the present invention is to provide improved photoelectric control apparatus utilizing a minimum of parts for the accomplishment of improved photoelectric light sensitive electric load control.

It is still another object of the present invention to provide control apparatus for the actuation and control of electric circuits wherein the circuit switching means is directly responsive to a photosensitive gaseous discharge device.

Still another object of the present invention is to provide high current photosensitive glow discharge devices capable of directly actuating electric load circuit controlling means.

Briefly stated, in accord with the present invention I provide photoelectric means including at least a single high current capacity gaseous glow discharge device connected across an electric line and thermally coupled with a thermally responsive switch which is in circuit with, and operatively controls, the operation of an electric load circuit. Upon the application of a predetermined voltage to the glow discharge device and the incidence of a sufficient quantum of radiant energy thereupon, the device becomes conducting. If the ambient light level and the applied voltage are of the proper value, the near continuous operation of the gaseous discharge device supplies sufficient thermal energy to the thermal switching means to cause it to activate the electric load. Similarly, when either the applied voltage or the applied radiant energy falls below a predetermined value, the current conduction through the gaseous electric discharge device will fall below a value which is sufficient to maintain sufficient thermal coupling to continually activate the supply voltage to the electric load.

In further accord with the present invention, I provide high current gaseous electric discharge devices adapted to sustain substantially the entire voltage from an electric line and to provide sufficient heating thereby as to directly couple with the thermally responsive switch for the actuation and switching of an electric load.

Figure 2:
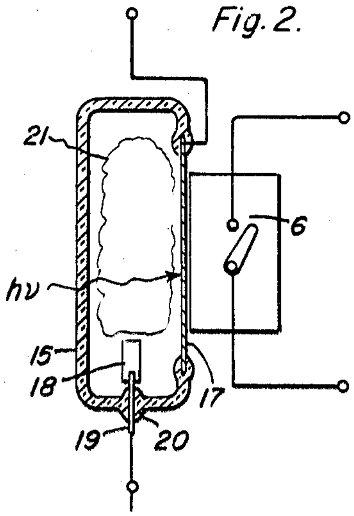
Figure 3:
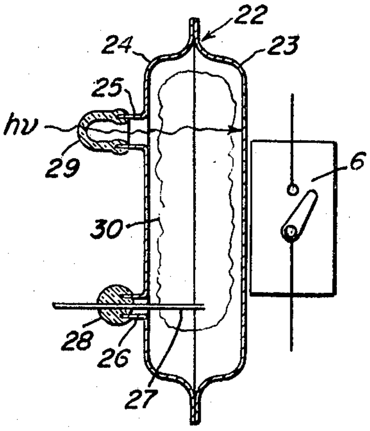
Figure 4:
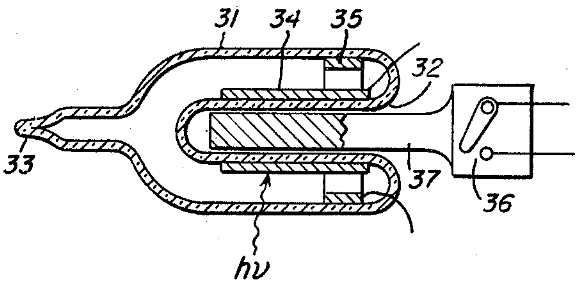
Figure 5:
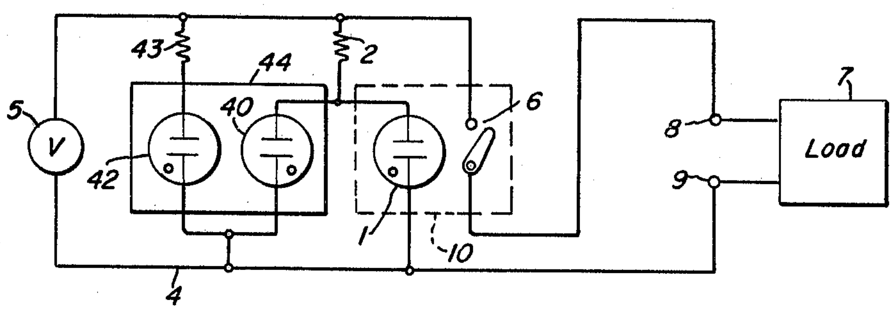

The novel features believed characteristic of the present invention are set forth in the appended claims. The invention itself, together with further objects and advantages thereof, may best be understood by reference to the appended drawing in which:

FIGURE 1 is a simplified schematic circuit of a photoelectric control apparatus constructed in accord with the present invention utilizing a high current gaseous discharge glow device, FIGURES 2, 3, and 4 illustrate various embodiments of high current gaseous glow discharge devices constructed in accord with the present invention and adapted to actuate directly a thermal switch, and FIGURE 5 illustrates an alternative embodiment to the apparatus of FIGURE 1 utilizing a parallel connected glow discharge device for broadening the operating voltage range of the apparatus in accord with the present invention.

In FIGURE 1 a high current glow discharge device 1 and a current limiting resistor 2 are connected across lines 3 and 4 which are connected to a source 5 of alternating or unidirectional voltage. A thermally-actuated switch 6 is connected in series circuit relationship with lines 3 which, together with line 4, is thereafter connected to an electric load 7 at terminals 8 and 9. Thermal switch 6 is coupled in thermal relationship with glow discharge device 1 as indicated by dotted lines 10. If the voltage source is unidirectional, an additional element, such as a switch or circuit breaker must be in series with device 1 to open the circuit periodically to allow deionization of device 1. In an operative embodiment of the apparatus of FIGURE 1, the electric load 7 may, for example, be a street light luminaire and switch 6 is normally in the closed position so that in the absence of any incident radiant energy as for example daylight or sunlight upon photoelectric gaseous discharge device 1, the line voltage is applied to the load to cause the light to be illuminated. On the other hand, during daylight conditions when a high level of incident radiation falls upon gaseous discharge device 1, it conducts heavily and the heating thereof causes activation of switch 6, to cause the opening thereof, disconnecting the supply voltage from the luminaire and causing the light to be extinguished.

The characteristics of gaseous discharge devices, in general, are well known in the art. Normally such devices are utilized to operate in response to preselected wavelengths, most generally in the visible spectrum and may, for example, have anode and cathode closely spaced, of the same material, and constructed with a filling of from 10 to 100 torr of an inert gas as, for example, neon or argon. Characteristically, these devices are actuated when incident radiation sufficient to cause the emission of photoelectrons from the cathode thereof is incident thereupon. When such devices are connected in alternating current circuits a phenomenon known as the "dark effect" occurs. This so-called "dark effect," in photoelectric discharge devices, is a delayed or non-occurring breakdown when voltage is applied in the absence of incident radiation. Some expedients used to overcome the dark effect include the inclusion within the device of low work function materials such as cesium, lithium and the like for the same purpose and the inclusion therein of small quantities of radioactive material so that photoelectrons are present to keep the gas within the tube ionized, irrespective of the polarity applied to the electrodes thereof.

In accord with the present invention, all such expedients are avoided diligently since it is an object of the present invention to utilize the dark effect so that the combination of the photo-sensitive gaseous discharge device and the thermal switch in thermal coupling relationship therewith becomes an integrating circuit which causes the voltage applied to the load to be interrupted upon the occurrence of a sufficiently high value of average ionizing incidents due to incident radiation upon the cathode of the photoelectric gaseous discharge device. In this respect, the apparatus operates substantially as follows. Assuming the switch 6 to be in the "on" position and closed with no current flowing through gaseous discharge device 1, a voltage of approximately 100 to 160 volts A.C., for example, may be applied by leads 3 and 4 to the anode 11 and the cathode 12 of device 1, respectively. A photon of incident radiation within the desired wavelength represented by $h\nu$ is incident upon the cathode 11 of discharge device 1. The incident photon causes the ejection of a photoelectron which, by collision with gas molecules, causes an avalanche breakdown and the establishment of a glow discharge within device 1. This glow discharge continues so long as the cathode 12 is negative and the anode 11 is positive. During this glow discharge some heating of the cathode occurs and some heat coupling between cathode 12 and switch 6 occurs. It is not, however, sufficient to cause the opening of switch 6.

The incident photon may have been due to a general level of increasing radiant energy of the appropriate wavelength caused, for example, by approaching daylight. Alternatively, the incident photon may have been caused by some spurious-non-repetitive incident as, for example, by a cosmic ray. If the device were instantaneously operated by a single incidence of breakdown, a single cosmic ray could activate the mechanism. Obviously, such an apparatus would not be practical. In accord with the invention, when the next half cycle in which the cathode is negative occurs, opportunity presents itself for another photon $h\nu$, to be incident upon the cathode and cause the breakdown of the device and heating of the cathode and of the switch 6. When, in the case of approaching daylight, a sufficient number of such incidents occurs on successive half cycles (although not necessarily upon each successive half cycle) the integrating characteristics of the apparatus causes the heating of the switch 6 to be sufficient to open the circuit and extinguish the street light. It is evident, therefore, that the apparatus works upon a statistical basis and causes the thermal switch to be activated when the average of a sufficient number of samples caused by alternate half cycles of an alternating current voltage are the subject of ionizing breakdown of the discharge device to indicate a steady state increase in ambient light levels.

The same statistical averaging occurs to cause load 7, as for example, a street light luminaire, to be energized when the ambient light level falls below a predetermined value. Thus, for example, when the statistical number of ionizing incidents occurring on successive half cycles becomes so few that the average heating allows the thermal switch to cool, the thermal switch recloses and the luminaire is again illuminated, and stays so, until a sufficient number of successive or near-successive half cycles result in a sufficient statistical breakdown pattern as to activate thermal switch again.

FIGURE 2 of the drawing illustrates, in vertical cross-section, a photoelectric light-sensitive gaseous glow discharge device suitable for use in the apparatus of FIGURE 1. The device of FIGURE 2 includes an outer envelope 15, comprised of a cylindrical apertured glass or similar transparent non-conducting member 16 and a disc-shaped metallic cathode member 17 hermetically sealed in appropriate glass-to-metal seals around the periphery thereof into the inwardly depending edges of re-entrant glass member 16. A small anode member 18 is located at the periphery of envelope 16 and is supported and electrically connected with a lead-in wire 19 which is hermetically sealed through glass member 16 of envelope 15 at seal 20. Cathode member 17 is exposed on one side thereof to the inner portion of envelope 15 and on the other side thereof to the exterior of the discharge device and may readily be placed in direct contact and thermal coupling with thermal switch 6, as illustrated. Glass envelope 16 may comprise any transparent glass or similar material which is transmissive to visible and/or ultraviolet radiation. In the specific application discussed herein, in which the apparatus of FIGURE 1 is to be utilized to activate a street lighting luminaire it has been found that the near ultraviolet radiation falling within approximately 3000 to 4000 A. undergoes a rapid rate of build-up in the early moments of daylight and a rapid decay in the early moments of twilight. Accordingly, it is highly desirable that this particular wavelength band be passed through whatever glass or similar material comprises envelope 16. Since, however, in many instances this particular wavelength is not to be sensed, it is desirable in accord with the present invention, that the device be utilized to sense ultraviolet and visible radiation from approximately 3000 to 6000 A. units. Cathode 17 is chosen to be light-sensitive within the wavelength spectrum listed above, and may conveniently comprise nickel or molybdenum, although other suitable materials having work functions higher than 3.5 electron volts (in order to avoid spurious photoelectric emission and a diminution of the dark effect) such as for example tungsten, rhenium, rhodium and the like may be utilized.

It should be noted at this point that it has been found necessary to avoid the formation of oxide films thereupon since the oxide films tend to decrease the photosensitivity of the cathode. Similarly, the use of any very low work function materials such as cesium, potassium, rubidium, and the like should be avoided in order to assure a pronounced dark effect. In operation of the device of FIGURE 2, photons of radiant energy $h\nu$ are readily incident through glass envelope 16 upon cathode 17 to cause the release of a photoelectron and the establishment of a glow discharge 21 within the envelope 15 to cause heating of cathode 17 and consequently and eventually the desired heating of thermal switch 6.

In FIGURE 3 of the drawing, an alternative construction for gaseous discharge device 1 is illustrated. In FIGURE 3, a metallic envelope 22 comprises a pair of dished plates 23 and 24, the latter of which has a pair of apertures connected with tubulations 25 and 26 connected thereto, comprises the envelope from which the device is fabricated and at the same time functions as the cathode electrode thereof. The anode electrode 27 is in the form of a straight wire which passes through tubulation 26 and is hermetically sealed by a glass globule 28. A glass window 29 closes off the end of tubulation 25 and serves as an entrance port for photons of radiant energy $h\nu$ to be incident upon cathode electrode 22 to cause the establishment of a glow discharge 30 therein to cause heating of cathode 22, which is in physical contact and thermal coupling with thermal switch 6, as is illustrated in FIGURES 1 and 2. A particular advantage of the structure of the glow discharge device of FIGURE 3 is that it is essentially a metal device, having only two glass globules associated therewith, both of which are mechanically very rugged. Although it may seem that window 29 is not sufficient to admit a sufficient quantity of radiant energy photons to cause the glow discharge to be established within the device by emission of photoelectrons from cathode 22, it has been found to be quite sufficient since a very large quantity of photons are available and the entire area need not be of glass to have a sufficient statistical averaging to cause the operation of the device as described with respect to FIGURE 1 of the drawing.

FIGURE 4 of the drawing illustrates an alternative embodiment of the present invention having an added advantage over the devices of FIGURES 2 and 3 in that no large area metal-to-glass seals are required, thus removing a large possible source of failure and manufacturing difficulties. In FIGURE 4, the device envelope 21 is in the form of a hollow re-entrant cyclinder having a cylindrical inner cavity 32 therein and closed off at a nipple 33. A cylindrical cathode member 34 surrounds the re-entrant portion of the envelope defining the cavity 32 and is held firmly in contact therewith by appropriate techniques. An annular ring shaped anode 35 of relatively short length is in close juxtaposition and fits within the outer periphery of envelope 31 and has a coaxial symmetry with respect to cathode member 34. A thermal probe 37, operatively and thermally connected to thermal switch 36, is inserted in a tight fitting relationship within cavity 32 of envelope 31. In operation, a photon of energy $h\nu$ is incident upon cathode member 34, causing the emission of photoelectrons and the establishment of the glow discharge between cathode 34 and anode 35. The high current of this glow discharge causes a heating of cathode 34, which heating is transmitted through the glass of the re-entrant portion of envelope 31 and thermally coupled to probe 37, causing the eventual heating of thermal switch 36 as in the devices of FIGURES 2 and 3.

The devices of FIGURES 2, 3 and 4, utilized as lamp 1 of FIGURE 1, are obviously different from conventional gaseous glow discharge devices, even those which operate as photoelectric apparatus. This is because these devices are specifically designed to operate upon high currents and are further designed to have the cathode thereof such as to permit thermal coupling between the cathode and an external member, namely, thermal switch 6, to cause the actuation thereof in the nature of an integrating apparatus. In order that the apparatus be susceptible to high current operation (which operating upon a 120 volts supply and utilizing a maximum current of approximately 0.5 ampere, requires an operating power level of approximately 5 watts), it is necessary that the glow discharge within the device be able to sustain a voltage drop of approximately 100 volts. In order to accomplish this without destruction of the tube or exceedingly short life, it is necessary that a substantial area of cathode be provided which, for the foregoing values of the essential parameters, has been determined to be approximately 1 square centimeter of area. With higher or lower voltages and higher or lower current levels comparable areas would be utilized.

In further accord with the present invention, in order that the high currents be possible, I have found that the value of the current limiting resistance 2 in FIGURE 1 of the drawing must be relatively low as compared with similar circuits in which the high current type gaseous discharge device is not utilized. Such circuits may use a current limiting resistance of 2000 or 3000 ohms. In accord with the present invention, I find that for 120 volt operation a current limiting resistor of approximately 100 ohms or less and preferably approximately 80 ohms is sufficient to prevent destruction of the gaseous discharge device, but nevertheless allow the necessary high currents, in order that the apparatus functions as is described.

In order that the gaseous discharge operate as described and that a relatively low level of incident radiation be sufficient to cause ionization of the gas, it is desirable to use a filling gas of the so-called "Penning gas," that is, a gas comprised of two substances having higher and lower ionization potentials, the one having the higher ionization potential the major portion and the one with the lower ionization potential being the minor portion and further satisfying the criteria that the metastable state or states of the major gas have an energy level which is as high or higher than the ionization potential of the minor gas portion. Conveniently, I find that a Penning mixture of approximately 99% neon and 1% argon is adequate and operates successfully in devices and apparatus in accord with the present invention. This gas should be present within the envelope of the gaseous discharge device in such quantities and pressure as will allow operation over a protracted length of time without such cleanup as to cause unreasonably high breakdown potentials. As is well-known in the art, the minimum breakdown potential for any given gaseous mixture or gas and electrode configuration is determined by the Paschen curve for that gas and electrode spacing, and is given by a plot of voltage versus the product of pressure and interelectrode distance. For devices constructed in accord with the present invention in which the interelectrode distance is approximately 3 millimeters, the Paschen minimum occurs at approximately 30 torr. However, if the devices were intially filled with 30 torr of gas and some cleanup occurred the low breakdown potential would rapidly rise. Since the Paschen minimum is approached rather slowly from the high pressure direction, I prefer, therefore, to fill with the pressure of 50–100 torr so that any cleanup of gasses therein will not appreciably cause a change in the breakdown characteristics for the worse, but rather, the initial change will be to slowly lower the breakdown voltage.

If conventional glow tubes were utilized in the apparatus of FIGURE 1 for discharge device 1, rather than the specialized high current capacity discharge devices such as those, for example, illustrated in FIGURES 2, 3 and 4, there would be a possibility of breakdown of the device during reversed polarity of an alternating current cycle wherein the anode is negative. This is because, in conventional glow tubes, the anode and cathode are of substantially the same size and shape. Thus, the probability of a photon, $h\nu$, of radiant energy striking the anode when it is negative and causing the emission of a photoelectron therefrom is equally as high as that of a photon striking the cathode when it is negative. In devices in accord with the present invention, however, the anode is very small as compared with the cathode and, additionally, as for example in the device of FIGURE 3, may also be constructed in such a manner as to be out of line-of-sight from any aperture through which a photon of visible or ultraviolet light may impinge. This leaves only the possibility of the improbable cosmic ray or other high penetration ionizing particle striking the cathode. Accordingly, in utilizing the devices of FIGURES 2, 3 and 4, or their functional equivalents, which have large cathode area as compared with the anode and which the anode is relatively shielded from the incidence of radiant energy, it is not necessary to include any external circuit interrupting device or rectifier device in series relationship with voltage dropping resistor 2 and gaseous breakdown device 1, since the difference in anode and cathode size and portion functions to provide and act as deionization means operative each half cycle. It is within the contemplation of the invention, however, that for safety sake, and to ensure against breakdown in the reverse direction that such a rectifier be included. Use of such devices is optional, however, since apparatus in accord with the present invention functions without such a rectifier. Whether or not such a rectifier is included is dictated by cost considerations and the specific designs of discharge device 1 utilized in the apparatus of FIGURE 1.

A further problem to be overcome, in apparatus of this type, is to ensure that there is a sufficient range of operating voltages over which the statistical averaging effect of the repetitively ionizable gaseous discharge device and the thermal switch constituting an integrating circuit may function in response to an average number of incidents of radiant energy upon the cathode electrode to cause operation of the switch to activate or deactivate an electric load. In order to assure a wide range of operating voltages the apparatus of FIGURE 5 may be utilized.

In FIGURE 5, in which like components to those of FIGURE 1 are identified with like reference numerals, a voltage source 5 is connected to line conductors 3 and 4 and a gaseous glow discharge device 1 and a voltage dropping resistor 2 is connected in series circuit relationship across the line. Additionally a second gaseous glow discharge device 40 is connected in parallel with gaseous discharge device 1 across the line and is in light coupled relationship with a third gaseous discharge device 42 which is in series with a voltage dropping resistor 43 across line conductors 3 and 4. Gaseous discharge devices 40 and 42 are coupled in light-coupled relationship and are contained together in a light impervious container represented by box 44. Gaseous discharge device 40 should be a high current device as device 1, but need not have a cathode adapted to couple exterior thereof thermally. The dark effect should be emphasized as in device 1. On the other hand, discharge device 42 may be a conventional glow discharge tube, as for example, the General Electric type Ne–2. Discharge device 40 is chosen to have a breakdown voltage that is slightly low as compared with the breakdown voltage of discharge device 1 in the dark, while discharge device 42, which is required to be in operation at all times so as to cause discharge device 40 to always be subject to radiant energy, should have a very low breakdown voltage so as to break down in the absence of radiant energy. Under these conditions, with the breakdown voltage of discharge device 40 being less than that of discharge device 1 and being always subject to incident radiation, the discharge device 40 will always break down prior to break down of discharge device 1, thus causing the applied voltage to discharge device 1 to be "locked in" so that the voltage applied thereto does not rise above the operating voltage of gaseous discharge device 40.

As an example of operation of devices in accord with this embodiment of the invention, I have utilized two breakdown devices 1 and 40 both having all measures taken in order to emphasize the dark effect, namely, the lamps have nickel electrodes free of oxide and no low-work function material therein. Both are filled with a Penning type gas filling of neon plus 1% argon by volume at a pressure of approximately 50 torr. The dark breakdown voltage of device 1 was 110 volts or greater and lamp 40 had a breakdown voltage of 100 volts under the controlled radiation of device 42. Under these conditions with lamp 40 in an enclosure constantly bathed in the emission of a very low breakdown voltage discharge device 42, lamp 1 will always fire subsequent to lamp 40, or not fire at all, because of its long statistical time lag and a wide range of line voltages may be used. In practice, utilizing the aforementioned devices, lamp 1 has fired under appropriate lighting conditions at voltages ranging from 80–160 volts A.C. Breakdown glow discharge tube 40 that is under constant illumination by virtue of its light coupled relationship with very low breakdown voltage glow tube 42, operates as a limiter, limiting the voltage applied across breakdown glow discharge device 1 to a predetermined value. Thus, as the applied voltage wave is applied between conductors 3 and 4, and prior to breakdown of device 1, device 40 breaks down and conducts drawing current through resistance 2 and establishes a maximum voltage drop across both discharge devices 40 and 1. With a constant voltage applied across gaseous discharge device 1, its time of breakdown is dependent solely upon accumulative effect of incident radiation. Accordingly, a wider range of applied voltages at voltage source 5 may be utilized, due to the limiting effect of parallel glow discharge device 40. However, upon incidence of sufficient radiation on glow discharge device 1, on any given half cycle, it will break down prior to device 40, and device 40 will most probably not break down. Accumulation of thermal energy from successive discharges through device 1 will thermally activate switch 6, to turn the load off.

While the embodiment of the invention utilizing the parallel gaseous discharge devices, described above, has applicability to the apparatus utilizing high current breakdown glow discharge device illustrated and described in the present invention, its application is much broader. In the copending concurrently filed applications of Nuckolls and Osteen, mentioned hereinbefore, the complete disclosure of which is incorporated herein by reference thereto, there is broadly disclosed and claimed the combination of a photosensitive discharge device, means for periodically interrupting conduction within the photosensitive discharge device, and means responsive to the operation of the discharge device for controlling an electric load. While the specifically-disclosed photosensitive discharge devices utilized in accord with the Nuckolls and Osteen device and apparatus are generally not high current discharge devices and the series current limiting resistor is generally of the order of several thousand ohms, this difference is not important with respect to the applicability of this feature of the present invention. The apparatus of that invention is sufficiently similar to the apparatus of the present invention, so that the combination of a parallel connected glow discharge device which is permanently subjected to radiation and operates in the light at all times, to serve as limiter to increase the range of operating voltages of the Nuckolls et al. apparatus and devices may be achieved in accord with the present invention.

While I have shown and described several embodiments of my invention, it will be apparent to those skilled in the art that many changes and modifications may be made without departing from my invention in its broader aspects; and I therefore intend the appended claims to cover all such changes and modifications as fall within the true spirit and scope of my invention.

I claim:

1. A photoelectric control apparatus for switching operating voltages to an electric load and comprising:

(a) Photoelectric means adapted to carry high current when in a current conducting condition and including:

($a_1$) At least one gaseous discharge device which is normally nonconducting but which may be rendered conducting by the application of a predetermined voltage thereto and the simultaneous incidence of radiant energy ($a_2$) Said discharge device having a large area cathode as compared with the anode thereof, said cathode being disposed to thermally couple with a heat responsive member (b) Thermally actuated switch means operatively connected in circuit with said eletcrical load and adapted to energize and de-energzie said load ($b_2$) Said switch means being thermally coupled with said cathode of said gaseous discharge device and responsive to heating thereof by current conduction by said device to change from one switch position to another, (c) And means applying an operating voltage to said photoelectric means so that said switching may occur upon incidence of said radiant energy thereupon.

2. The apparatus of claim 1 wherein said heat responsive member is external of said gaseous discharge device.

3. The apparatus of claim 1 wherein said gaseous discharge device is adapted to break down selectively only upon alternate half-cycles of an alternating voltage when said cathode is negative and spurious breakdown when said anode is negative is inhibited.

4. The apparatus of claim 3 wherein said anode and cathode members of said gaseous discharge device are fabricated from a metal selected from the group consisting of nickel, molybdenum, tungsten, rhenium, and rhodium.

5. The apparatus of claim 1 wherein said photoelectric means comprises:

(a) A first gaseous discharge device having the dark effect thereof emphasized and having means to couple thermally to an exterior member and adapted to become conducting at a first predetermined voltage value at a given level of incident radiant energy, (b) A second gaseous discharge device having the dark effect thereof emphasized and adapted to become conducting at a second predetermined voltage value which is lower than said first predetermined voltage value, at said given level of incident radiant energy connected in parallel circuit relation with said first gaseous discharge device.

6. The apparatus of claim 5 wherein said second gaseous discharge device is maintained at all times during operation at a predetermined level of incident radiant energy.

7. The apparatus of claim 6 wherein said second gaseous discharge device is light coupled at all times during operation to a third gaseous discharge device having a very low value of breakdown voltage in the dark.

8. A photoelectric control apparatus for switching operating voltages to an electric load and comprising:

(a) Photoelectric means adapted to carry electric current when energized by an applied voltage and incident radiation, comprising:

($a_1$) A first gaseous discharge device adapted to become conducting at a first predetermined voltage value at a given level of incident radiant energy, ($a_2$) A second gaseous discharge device adapted to become condutcing at a second predetermined voltage value which is lower than said first predetermined value at said given level of incident radiant energy connected in parallel circuit relation with said first gaseous discharge device, (b) Means for applying an operating voltage at least as high as said second predetermined voltage value across said gaseous discharge device, (c) Means operatively associated with said first gaseous discharge device and responsive to the level of current conducted thereby to control voltage applied to said load.

9. The apparatus of claim 8 wherein said second gaseous discharge device is maintained at all times during operation at a predetermined level of incident radiant energy.

10. The apparatus of claim 9 wherein said second gaseous discharge device is light coupled at all times during operation to a light emitting device having a very low level of breakdown voltage in the dark.

11. A gaseous electric discharge device adapted to carry relatively high currents when subjected to a given voltage and exposed to incident radiant energy and comprising:

(a) An anode electrode (b) A cathode electrode that is very large in area as compared with said anode electrode (c) An envelope enclosing said anode and said cathode electrodes and containing at least a portion thereof that permits incident radiation to pass therethrough and fall upon said cathode (d) Said cathode being adapted to become heated by said high current and adapted to thermally couple with a heat-responsive member, and (e) A gaseous filling at low pressure within said envelope adapted to become ionized and sustain a glow discharge.

References Cited

UNITED STATES PATENTS

| | | | |
|---|---|---|---|
| 2,513,840 | 7/1950 | Berland et al. | 315—73 X |
| 2,928,025 | 3/1960 | McIlvaine | 200—61.02 X |

JAMES W. LAWRENCE, Primary Examiner

C. R. CAMPBELL, Assistant Examiner

U.S. Cl. X.R.

200—61.02; 250—206, 215; 313—100; 315—73; 337—102, 108